(12) United States Patent
Tanikoshi et al.

(10) Patent No.: US 10,876,243 B2
(45) Date of Patent: Dec. 29, 2020

(54) DRUM-TYPE WASHING MACHINE

(71) Applicants: QINGDAO HAIER WASHING MACHINE CO., LTD., Shandong (CN); AQUA CO., LTD, Tokyo (JP)

(72) Inventors: Osamu Tanikoshi, Tokyo (JP); Shigeharu Nakamoto, Tokyo (JP); Tomohiro Yamauchi, Tokyo (JP); Takayuki Nagai, Tokyo (JP); Takeya Matsushita, Tokyo (JP); Hiroyuki Kitakawa, Tokyo (JP)

(73) Assignees: Qingdao Haier Washing Machine Co., Ltd., Shandong (CN); Aqua Co., Ltd., Tokyo (JP)

( * ) Notice: Subject to any disclaimer, the term of this patent is extended or adjusted under 35 U.S.C. 154(b) by 202 days.

(21) Appl. No.: 16/063,223

(22) PCT Filed: Dec. 16, 2016

(86) PCT No.: PCT/CN2016/110377
§ 371 (c)(1),
(2) Date: Jun. 15, 2018

(87) PCT Pub. No.: WO2017/101857
PCT Pub. Date: Jun. 22, 2017

(65) Prior Publication Data
US 2018/0371670 A1 Dec. 27, 2018

(30) Foreign Application Priority Data
Dec. 16, 2015 (JP) .................................. 2015-245515

(51) Int. Cl.
*D06F 37/30* (2020.01)
*D06F 37/40* (2006.01)
(Continued)

(52) U.S. Cl.
CPC ............ *D06F 37/304* (2013.01); *D06F 37/06* (2013.01); *D06F 37/40* (2013.01); *D06F 37/42* (2013.01);
(Continued)

(58) Field of Classification Search
CPC ........... D06F 23/02; D06F 23/06; D06F 37/40
See application file for complete search history.

(56) References Cited

U.S. PATENT DOCUMENTS

| 5,327,603 | A | * | 7/1994 | Roh | ........................ | D06F 13/02 68/131 |
| 2008/0109967 | A1 | * | 5/2008 | Ashrafzadeh | ........... | D06F 13/02 8/159 |

FOREIGN PATENT DOCUMENTS

| CN | 1465766 A | 1/2004 |
| CN | 103668855 A | 3/2014 |

(Continued)

OTHER PUBLICATIONS

International Search Report and Written Opinion dated Mar. 23, 2017, regarding PCT/CN2016/110377.
(Continued)

*Primary Examiner* — Spencer E Bell
(74) *Attorney, Agent, or Firm* — Arent Fox LLP

(57) ABSTRACT

A drum-type washing machine includes an outer tub disposed inside a machine housing a drum disposed in the outer tub and capable of rotating about an axis inclined with respect to a horizontal direction as a center; a rotating body disposed in the drum and having a protruding portion on the surface; a driving portion including a driving motor and is configured to transmit a torque of the driving motor to the drum and the rotor so as to rotate the drum and the rotating body at different rotation speeds; and a controlling portion for controlling an operation of the driving portion. The controlling portion is configured to perform a reduction
(Continued)

control for reducing a load when a magnitude of the load applied to the rotating body exceeds a predetermined magnitude in a washing process and/or a rinsing process.

3 Claims, 12 Drawing Sheets

(51) Int. Cl.
*D06F 37/42* (2006.01)
*D06F 37/06* (2006.01)
(52) U.S. Cl.
CPC .... *D06F 2202/12* (2013.01); *D06F 2204/065* (2013.01)

(56) References Cited

FOREIGN PATENT DOCUMENTS

| | | | |
|---|---|---|---|
| CN | 105102707 | A | 11/2015 |
| EP | 1500737 | A2 | 1/2005 |
| EP | 2868793 | A1 | 5/2015 |
| JP | 2013052053 | A | 3/2013 |
| JP | 2015167663 | A | 9/2015 |
| WO | 2015127823 | A1 | 3/2015 |

OTHER PUBLICATIONS

Extended European Search Report received in European Patent Application No. 16874914 dated Jul. 31, 2019.

* cited by examiner

DRUM-TYPE WASHING MACHINE

TECHNICAL FIELD

The present disclosure relates to a drum-type washing machine. Such a drum-type washing machine may continuously perform washing to drying operations, or may just carry out washing without drying.

BACKGROUND

Conventionally, in a drum-type washing machine, a drum of a horizontal shaft type is rotated in an outer tub that stores water at a bottom portion, and laundry is lifted by a baffle provided in the drum and is dropped to inner peripheral surface of the drum so as to wash the laundry. In a configuration in which the laundry is agitated by the baffle, it is difficult for the laundry to intertwine with each other or rub against each other. Thus, in view of this, in a drum-type washing machine, in order to improve the washing performance, it is possible to adopt a configuration in which a stirring body is provided on rear surface of the drum, and the drum and the stirring body are separately rotated at different rotation speeds at the time of washing or rinsing.

SUMMARY

Regarding the drum-type washing machine described above, since a stirring body rotates at a rotation speed different from that of a drum at the time of washing and rinsing, laundry is easy to twist in the drum, and entanglement of the laundry is likely to occur.

The inventors have observed movement of the laundry inside the drum. When such entanglement occurs, the actions of the laundry occur as follows: in the drum, as the stirring body rotates, the entangled laundry twist to a central portion of the stirring body, and is pushed to an axis of the stirring body. When such a movement of the laundry occurs, the entangled laundry may gather at the center portion of the drum depending on the amount of laundry thrown into the drum. As a result, an amount of laundry may be clogged and compressed between a door that covers a front surface of the drum and the stirring body. In this case, a large load generated by the laundry is likely to be applied to the stirring body, which may lead to locking of the driving motor for driving the stirring body.

The present disclosure may address the above problems, and a drum-type washing machine according to the present disclosure may prevent locking of a driving motor due to the entanglement or the like.

A drum-type washing machine according to the present disclosure includes an outer tub, which is disposed within a machine housing; a drum, which is disposed in the outer tub and rotatable about a horizontal axis or about an axis inclined with respect to a horizontal direction; a rotating body, which is disposed in the drum and having a protruding portion on a surface of the rotating body; a driving portion, which includes a driving motor and transmits a torque of the driving motor to the drum and the rotating body to rotate the drum and the rotating body at different rotation speeds; and a controlling portion for controlling an operation of the driving portion. The controlling portion is configured to perform a reduction control for reducing the load when a magnitude of the load applied to the rotating body exceeds a predetermined magnitude in a washing process and/or a rinsing process.

According to the above configuration, when the load applied to the rotating body exceeds a predetermined magnitude due to cloth entanglement of the laundry in the drum, the reduction control is performed, and the load applied to the rotating body is reduced. This can prevent the locking of the driving motor.

The drum-type washing machine according to this aspect may further include a detecting portion for detecting a rotation speed of the driving motor. In this case, the controlling portion is further configured to adjust an electric power to be supplied to the driving motor so that the driving motor rotates at a target rotation speed when the rotation body is rotated under control of the controlling portion, and perform the reduction control, when the rotation speed of the driving motor reaches the target rotation speed that is equal to or less than a threshold value.

According to the above configuration, it is determined whether or not the load applied to the rotating body is increased based on the rotation speed of the driving motor, and thus, there is no need to provide a dedicated sensor for the determination, thereby preventing the increase on costs.

When the above configuration is adopted, the controlling portion makes the driving motor rotate clockwise and counterclockwise, and performs the reduction control when the rotation speed of the driving motor is equal to or less than the threshold value in both rotations.

With such a configuration, even if there are variations in the ease with which the rotating body and the driving motor rotate clockwise and counterclockwise in the driving portion, it is possible to accurately detect that the load applied to the rotating body is increased.

In the drum-type washing machine according to this aspect, as the reduction control, the controlling portion is further configured to rotate the driving motor so that the drum rotates at a rotation speed at which a centrifugal force acting on the laundry in the drum becomes greater than the gravity.

According to the above configuration, even if it occurs that the laundry entangled due to its entanglement in the drum may gather at the center portion of the drum and an amount of laundry may be clogged and compressed between a front surface of the drum and the stirring body to result in adding a huge load to the rotating body, the drum can rotate at a rotation speed at which the centrifugal force acting on the laundry in the drum becomes greater than the gravity by means of the reduction control, and it is possible to disperse the laundry at the central portion toward the inner peripheral surface side of the drum. Thus, the load applied to the rotating body can be effectively reduced.

In the above configuration, the following configuration may be adopted as follows: the driving portion is configured to be switched between a first driving mode, in which the drum and the rotating body are rotated at mutually different rotation speeds, and a second driving mode, in which the drum and the rotating body are integrally rotated at equal rotation speeds. In such a case, the controlling portion is further configured to rotate the driving motor so that the drum rotates at a rotation speed at which the centrifugal force acting on the laundry in the drum becomes greater than the gravity in the second driving mode.

With such a configuration, when the drum is rotated in the reduction control, the driving mode of the driving portion is switched to the second driving mode, so that the torque of the driving motor is smaller than that in the first driving mode. As a result, the rotation of the drum tends to rise up to the rotation speed at the time of reduction control, which is higher than that at the time of washing and rinsing.

According to the present disclosure, it may prevent the driving motor from being locked due to the entanglement or the like.

The effect or significance of the present disclosure will become more apparent from the description of the embodiments described below. It is to be noted that the following embodiments are merely examples for implementing the present disclosure, and the present disclosure is not limited to the ones described in the following embodiments.

DETAILED DESCRIPTION

Hereinafter, a drum-type washing machine having no drying function, which is an embodiment of a drum-type washing machine of the present disclosure, will be described with reference to the drawings.

Figure 1:
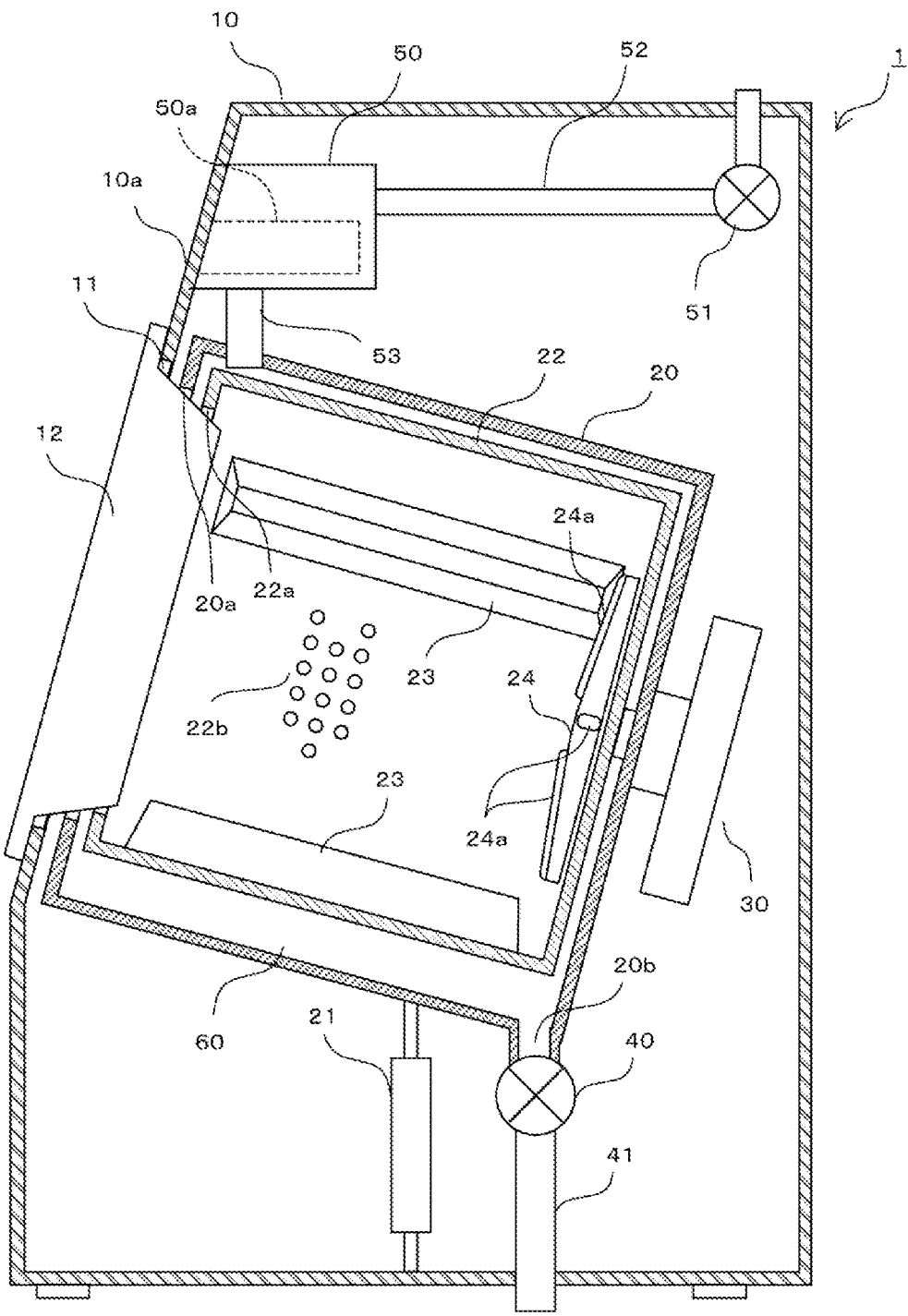
FIG. 1 is a side sectional view showing a configuration of a drum-type washing machine according to an embodiment.

FIG. 1 is a side sectional view showing a configuration of a drum-type washing machine 1.

A drum-type washing machine 1 is provided with a machine housing 10 constituting an external appearance. A front surface 10a of the machine housing 10 is inclined from a center portion to an upper portion, and an input opening 11 of a laundry is formed on a inclined surface. The input opening 11 is covered with a door 12 that can be freely opened and closed.

In the machine housing 10, an outer tub 20 is elastically supported by a plurality of dampers 21. In the outer tub 20, a drum 22 is rotatably disposed. The outer tub 20 and the drum 22 are inclined so that rear surface sides are lower with respect to the horizontal direction. As a result, the drum 22 rotates around the axis inclined with respect to the horizontal direction. The inclination angle of the outer tub 20 and the drum 22 may be about 10 to 20 degrees. An opening 20a in the front surface of the outer tub 20 and an opening 22a in the front surface of the drum 22 face the input opening 11, and all of the opening 20a, the opening 22a and the input opening 11 are closed by the door 12. On a peripheral wall of the drum 22, a large number of dewatering holes 22b are formed. Further, on an inner peripheral surface of the drum 22, three baffles 23 are provided at a substantially equal interval in a circumferential direction.

At a rear portion of the drum 22, a rotating body 24 is rotatably disposed. The rotating body 24 has a substantially disc shape. On surface of the rotating body 24, a plurality of protruding portions 24a radially extending from the center portion are formed. The rotating body 24 rotates coaxially with the drum 22.

A driving portion 30 for generating torque for driving the drum 22 and the rotating body 24 is disposed behind the outer tub 20. In a washing process and a rinsing process, the driving portion 30 rotates the drum 22 and the rotating body 24 at different rotation speeds in a same direction. Specifically, the driving portion 30 rotates the drum 22 at a rotation speed at which the centrifugal force acting on the laundry in the drum 22 becomes smaller than the gravity, and rotates the rotating body 24 at a rotation speed higher than the rotation speed of the drum 22. On the other hand, during the dewatering process, the driving portion 30 integrally rotates the drum 22 and the rotating body 24 at a rotation speed at which the centrifugal force acting on the laundry in the drum 22 becomes much larger than the gravity. The detailed configuration of the driving portion 30 will be described later.

At the bottom of the outer tub 20, a drain outlet portion 20b is formed. A drain valve 40 is provided in the drain outlet portion 20b. The drain valve 40 is connected to a drain hose 41. When the drain valve 40 is opened, water stored in the outer tub 20 is discharged outside the machine through the drain hose 41.

A detergent box 50 is disposed in the front upper portion of the machine housing 10. In the detergent box 50, a detergent container 50a in which a detergent is stored is housed in a detachable manner from the front. The detergent box 50 is connected by a water supply hose 52 to a water supply valve 51 disposed in a upper rear portion in the machine housing 10. Further, the detergent box 50 is connected to the upper portion of the outer tub 20 by a water filling pipe 53. When the water supply valve 51 is opened, tap water is supplied from the water tap into the outer tub 20 through the water supply hose 52, the detergent box 50 and the water injection pipe 53. At this time, the detergent contained in the detergent container 50a is pushed by the water flow, and is supplied into the outer tub 20.

Next, the configuration of the driving portion 30 is explained in details.

Figure 2:
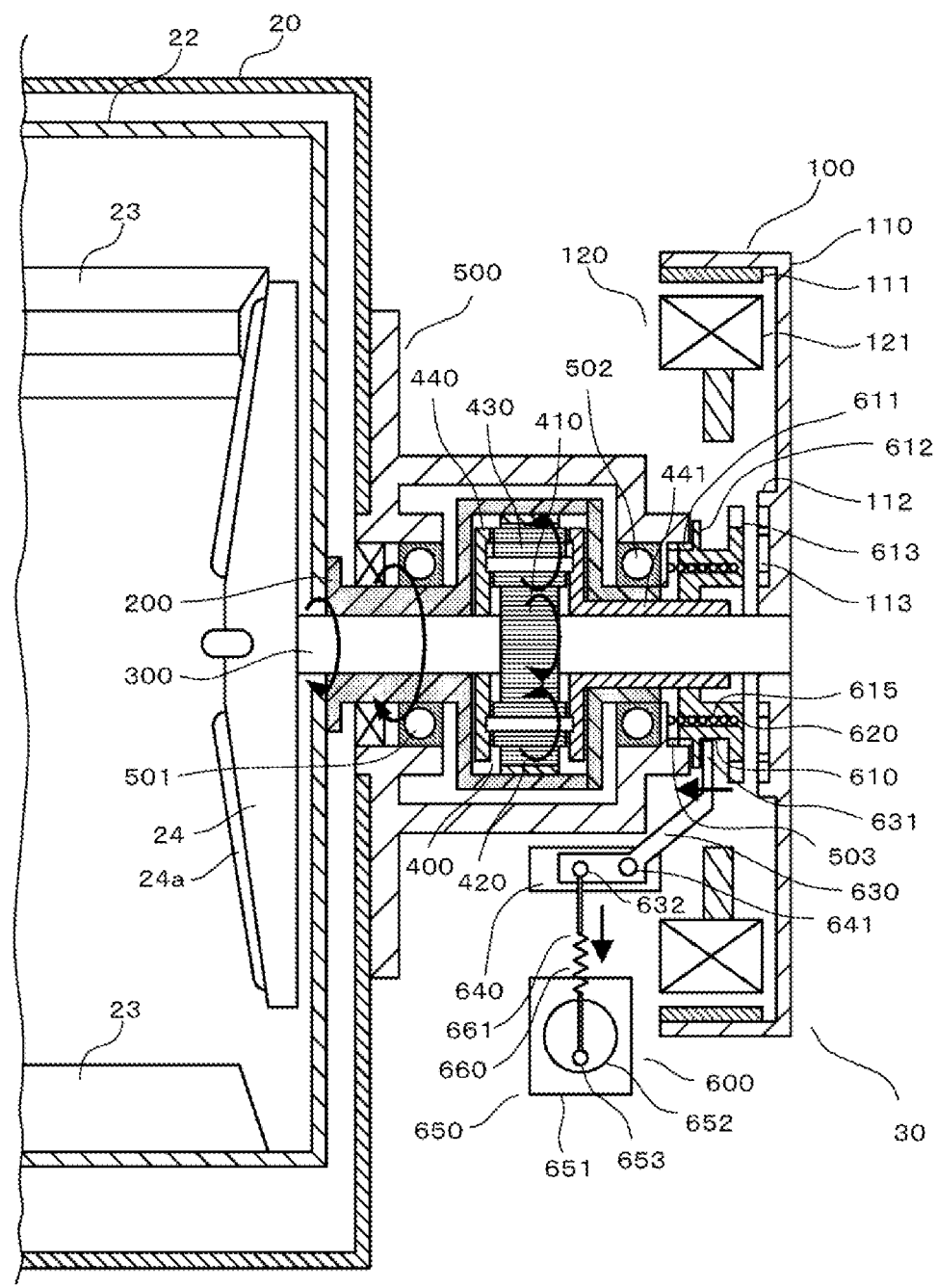
FIG. 2 is a cross-sectional view showing a configuration of a driving portion according to an embodiment.
Figure 3:
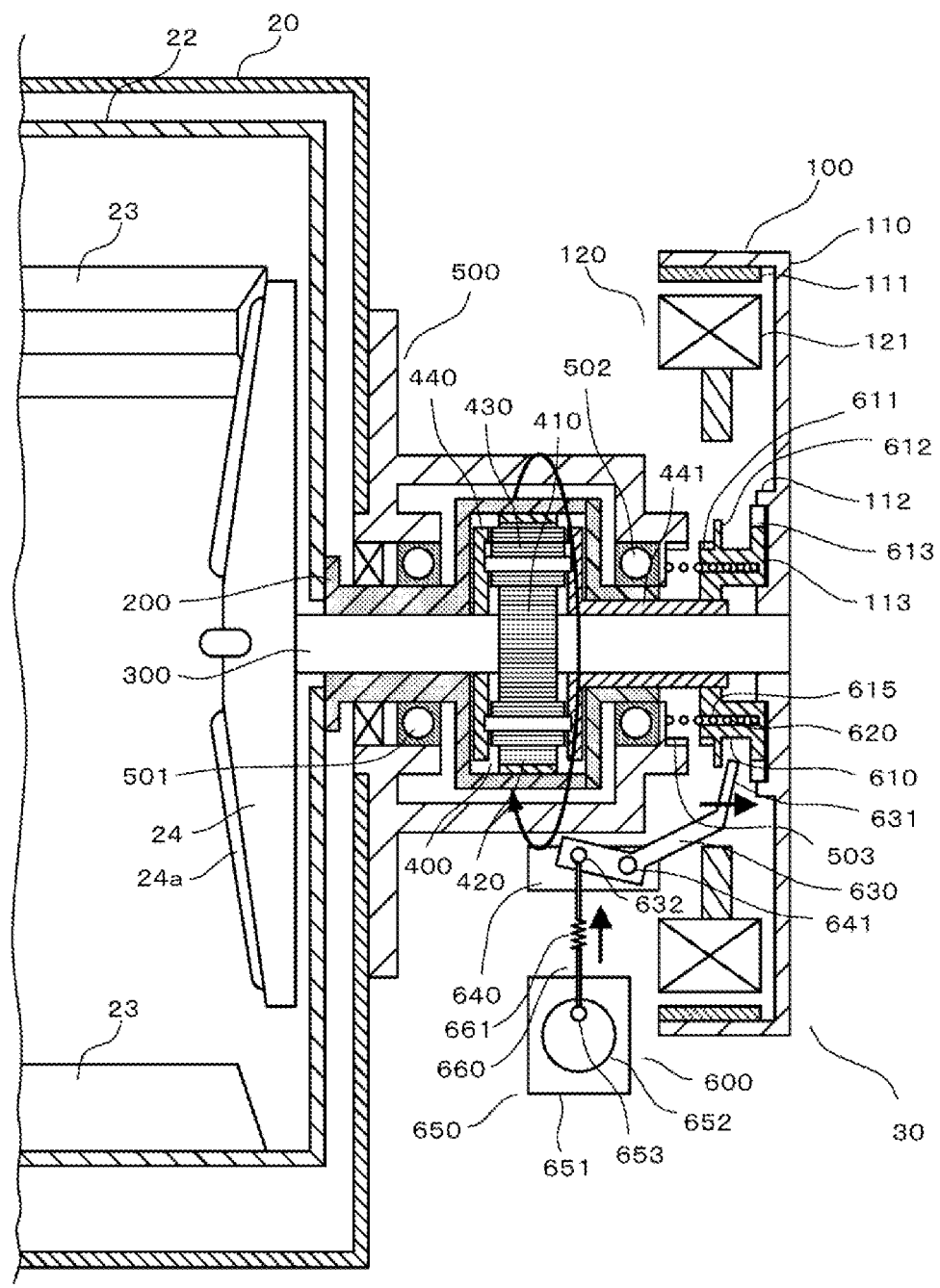
FIG. 3 is a cross-sectional view showing a configuration of a driving portion according to an embodiment.
Figure 4:
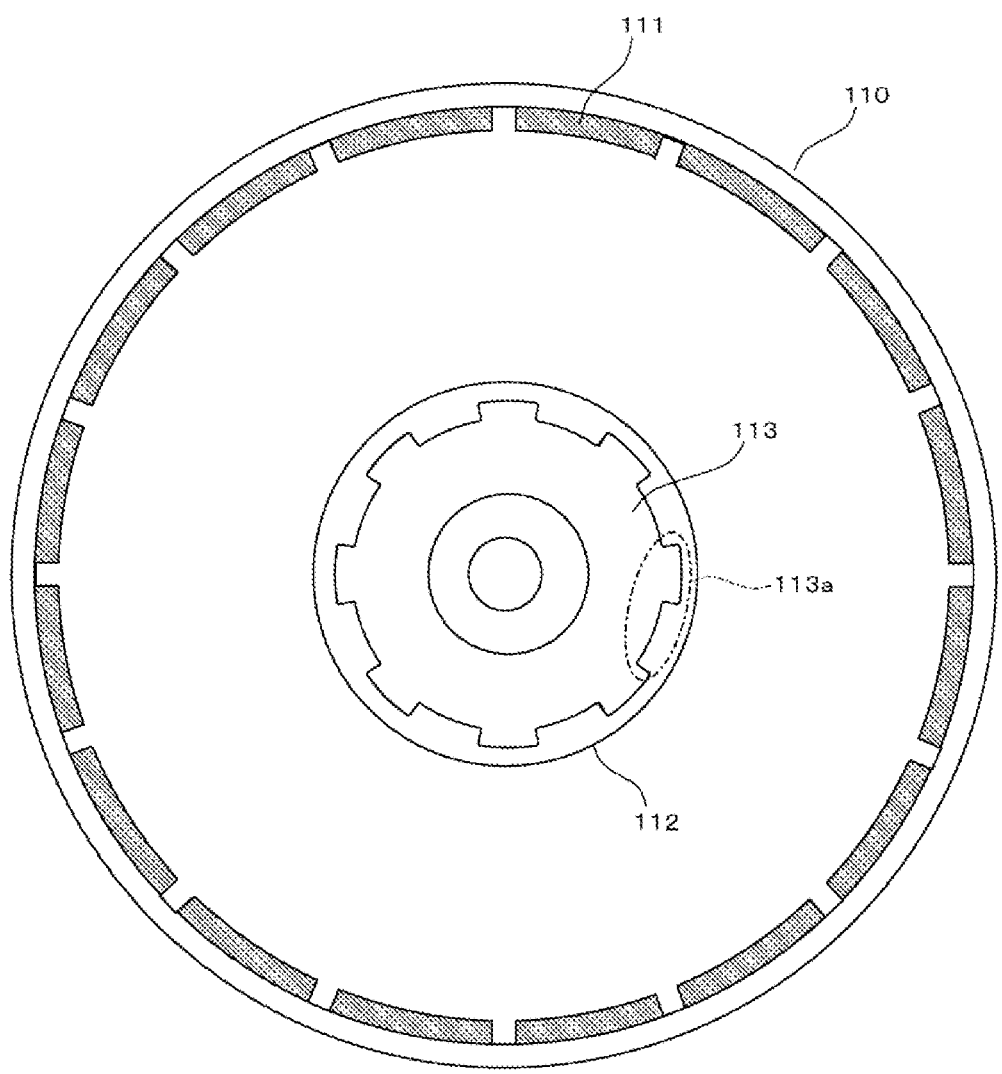
FIG. 4 is a front view of a rotor showing a configuration of the rotor of the driving motor according to an embodiment.
Figure 5:
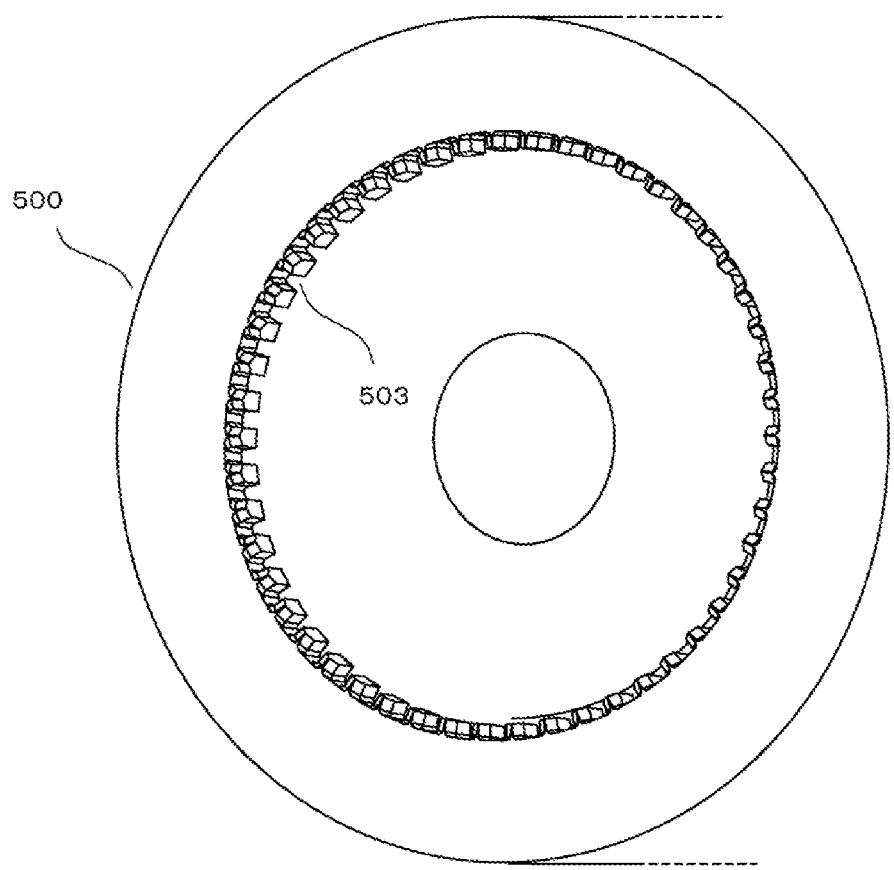
FIG. 5 is an enlarged perspective view of a rear portion of a bearing unit having a spline formed according to an embodiment.

FIG. 2 and FIG. 3 are cross-sectional views showing the configuration of the driving portion 30. FIG. 2 shows a state in which the driving portion 30 is switched to a biaxial driving mode, and FIG. 3 shows a state in which the driving portion 30 is switched to a uniaxial driving mode. FIG. 4 is a front view of the rotor 110 showing the configuration of the rotor 110 of the driving motor 100. FIG. 5 is an enlarged perspective view of a rear portion of the bearing unit 500 on which the spline 503 is formed. FIGS. 6(a) to (c) are views showing the configuration of the clutch body 610 of the clutch mechanism portion 600, which are a front view, a right side view and a rear view of the clutch body 610, respectively.

The driving portion 30 includes a driving motor 100, a first rotating shaft 200, a second rotating shaft 300, a planetary gear mechanism 400, a bearing unit 500 and a clutch mechanism portion 600.

The driving motor 100 is a brushless DC motor of an outer rotor type, and can generate torques for driving the rotating body 24 and the drum 22. The driving motor 100 includes a rotor 110 and a stator 120. The rotor 110 is formed in a cylindrical shape having a bottom, and permanent magnets 111 are arranged over an entire circumference on an inner peripheral surface thereof. A circular protrusion part 112 fixed to the second rotating shaft 300 is formed at the center portion of the rotor 110. An annular engaged concave portion 113 is formed in the protrusion part 112. As shown in FIG. 4, an outer peripheral surface in the engaged concave portion 113 has an uneven portion 113*a* over an entire circumference. The stator 120 has a coil 121 on its outer peripheral portion. When driving power is supplied from a motor driving portion, which will be described later, to the coil 121 of the stator 120, the rotor 110 rotates.

The first rotating shaft 200 has a hollow shape, and includes the second rotating shaft 300 and the planetary gear mechanism 400 therein. A central portion of the first rotating shaft 200 bulges outward, and the bulged portion serves as a housing portion of the planetary gear mechanism 400.

The planetary gear mechanism 400 reduces the rotation of the second rotating shaft 300, that is, the rotation of the rotor 110 of the driving motor 100, and transmits it to the first rotating shaft 200. The planetary gear mechanism 400 includes a sun gear 410, an annular internal gear 420 surrounding the sun gear 410, a plurality of sets of planetary gears 430 interposed between the sun gear 410 and the internal gear 420 and a planetary carrier 440 that freely holds the planetary gears 430.

The sun gear 410 is fixed to the second rotating shaft 300, and the internal gear 420 is fixed to the first rotating shaft 200. A set of planetary gears 430 includes a first gear and a second gear meshing with each other and rotating in opposite directions. The planetary carrier 440 includes a rearwardly extending planet carrier shaft 441. The planet carrier shaft 441 is coaxial with the first rotating shaft 200, and the interior thereof forms a hollow structure for the insertion of the second rotating shaft 300.

The rear end portion of the second rotating shaft 300 protrudes rearward from the planet carrier shaft 441, and is fixed to the protrusion part 112 of the rotor 110.

The bearing unit 500 rotatably supports the first rotating shaft 200 by means of two bearings 501 and 502 provided therein. As shown in FIG. 5, a spline 503 is formed on a inner surface of a rear end portion of the bearing unit 500 over an entire circumference. The bearing unit 500 is fixed to a rear surface of the outer tub 20, and in this state, the first rotating shaft 200 and the second rotating shaft 300 enter the outer tub 20. The drum 22 is fixed to the first rotating shaft 200, and the rotating body 24 is fixed to the second rotating shaft 300.

The clutch mechanism portion 600 switches the driving mode of the driving portion 30 between a biaxial driving mode and a uniaxial driving mode. The biaxial driving mode is a driving mode in which the drum 22 and the rotating body 24 are separately rotated in a manner of making the rotating body 24 rotate at a rotation speed higher than that of the drum 22, and the uniaxial driving mode is a driving mode in which the drum 22 and the rotating body 24 are integrally rotated in a manner of making the drum 22 and the rotating body 24 rotate at a same rotation speed. The biaxial driving mode corresponds to the first driving mode of the present disclosure, and the uniaxial driving mode corresponds to the second driving mode of the present disclosure.

The clutch mechanism portion 600 includes a clutch body 610, a clutch spring 620, a clutch lever 630, a lever supporting portion 640, a clutch driving device 650, and a relay rod 660.

Figure 6:
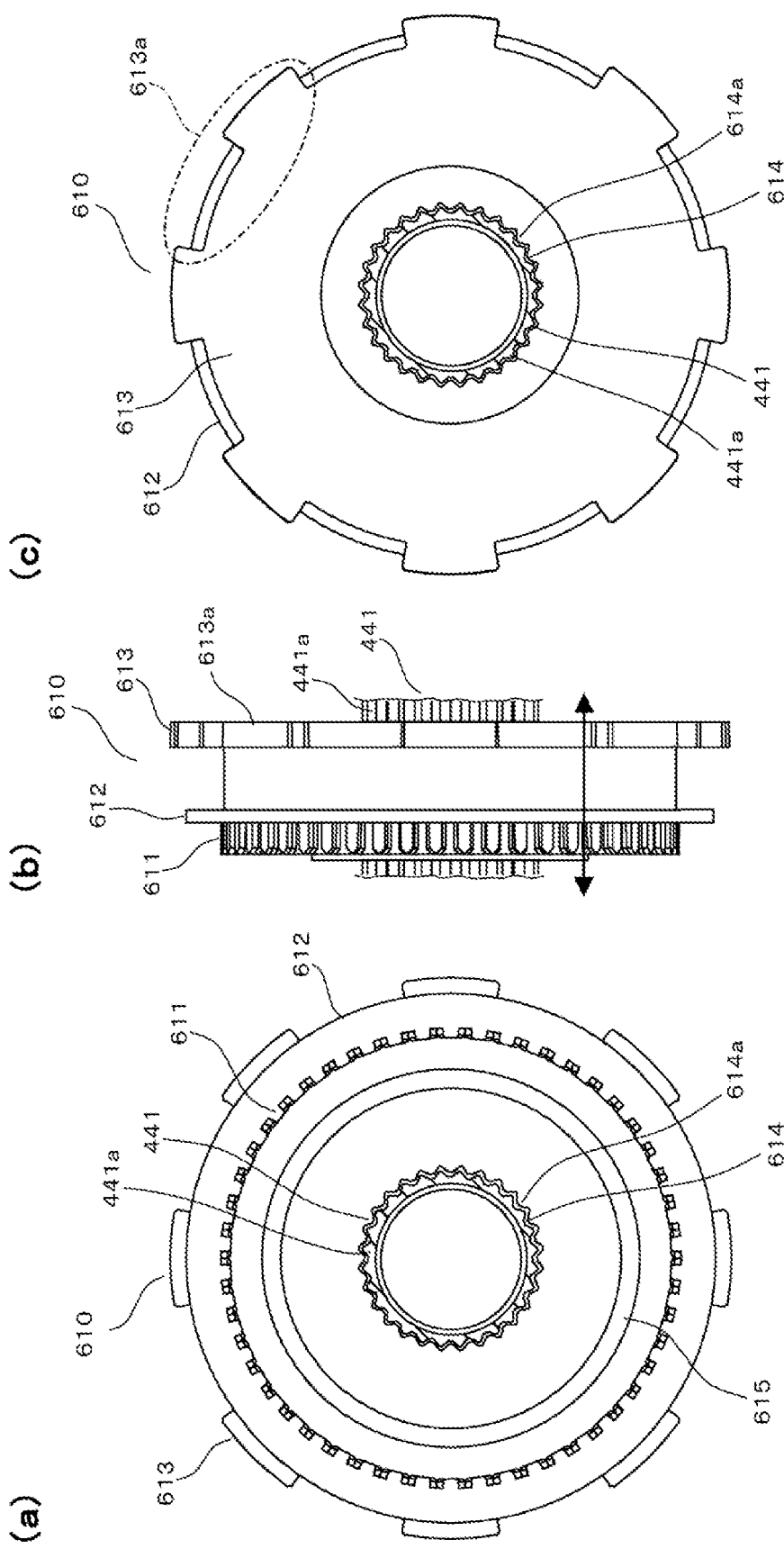
FIGS. 6(a) to 6(c) are views showing a configuration of a clutch body of a clutch mechanism portion according to an embodiment.

As shown in FIGS. 6(*a*) to 6(*c*), the clutch body 610 has a substantially disk shape. An annular spline 611 is formed on an outer peripheral surface of a front end portion of the clutch body 610. The spline 611 is formed to engage the spline 503 of the bearing unit 500. A flange portion 612 is formed on the outer peripheral surface of the clutch body 610 behind the spline 611. Further, an annular engaging flange portion 613 is formed at a rear end portion of the clutch body 610. The engaging flange portion 613 has a same shape as the engaged concave portion 113 of the rotor 110, and has an uneven portion 613*a* over an entire circumference at an outer peripheral portion. When the engaging flange portion 613 is inserted into the engaged concave portion 113, the uneven portions 613*a* and 113*a* are engaged with each other.

The planet carrier shaft 441 is inserted into a shaft hole 614 of the clutch body 610. The spline 614*a* formed on an inner peripheral surface of the shaft hole 614 is engaged with the spline 441*a* formed on an outer peripheral surface of the planet carrier shaft 441. As a result, although the clutch body 610 can move in a longitudinal direction with respect to the planet carrier shaft 441, the clutch body 610 cannot rotate in the circumferential direction.

In the clutch body 610, an annular accommodation groove 615 is formed outside the shaft hole 614, and the clutch spring 620 is accommodated in the accommodation groove 615. One end of the clutch spring 620 is in contact with a rear end portion of the bearing unit 500, and the other end is in contact with a bottom surface of the accommodation groove 615.

At the upper end portion of the clutch lever 630, a pressing portion 631 which contacts the rear surface of the flange portion 612 of the clutch body 610 and presses the flange portion 612 forward is formed. The clutch lever 630 is rotatably supported by a support shaft 641 provided on the lever supporting portion 640. An attachment shaft 632 is formed at the lower end portion of the clutch lever 630.

The clutch driving device 650 is disposed below the clutch lever 630. The clutch driving device 650 includes a torque motor 651 and a disk-shaped cam 652 which rotates about a horizontal axis by the torque of the torque motor 651. On an upper surface of the cam 652, a cam shaft 653 is provided on an outer peripheral portion. A rotation center of the cam 652 and a center of the attachment shaft 632 of the clutch lever 630 are aligned in the front-rear direction.

The relay rod 660 extends in a vertical direction and connects the clutch lever 630 and the cam 652. An upper end portion of the relay rod 660 is attached to the attachment shaft 632 of the clutch lever 630, and a lower end portion thereof is attached to the cam shaft 653 of the cam 652. A spring 661 is integrally formed at the intermediate position on the relay rod 660.

The lever supporting portion 640 and the clutch driving device 650 are fixed to the bearing unit 500 via, for example, a mounting plate (not shown in figures).

When the driving mode of the driving portion 30 is switched from the uniaxial driving mode to the biaxial driving mode, as shown in FIG. 2, the cam 652 is rotated by the torque motor 651 such that the cam shaft 653 is positioned at the lowest position. As the cam 652 rotates, the lower end portion of the clutch lever 630 is pulled downward by the relay rod 660. The clutch lever 630 rotates forward about the support shaft 641, and the pressing portion 631 pushes the clutch body 610 forward. Against the elastic force of the clutch spring 620, the clutch body 610 moves forward, and the spline 611 of the clutch body 610 and the spline 503 of the bearing unit 500 are engaged with each other.

When the cam shaft 653 moves to a predetermined intermediate position, the clutch body 610 reaches a position where the spline 611 engages with the spline 503. At this time, the spring 661 of the relay rod 660 is in a state of natural length. The clutch body 610 does not move to a position that is closer to the front than this engagement position (is). Therefore, when the cam shaft 653 moves from the predetermined position to the lowermost position, the spring 661 extends downward as shown in FIG. 2. In this case, since the clutch lever 630 is pulled so as to pivot forward by the spring 661, a pressing force is applied from the pressing portion 631 to the clutch body 610 in the engaged position. Therefore, the spline 611 can be firmly engaged with the spline 503.

When the spline 611 and the spline 503 are engaged with each other, the clutch body 610 cannot rotate in a circumferential direction with respect to the bearing unit 500, so that the planet carrier shaft 441 of the planetary gear mechanism 400, that is, the planetary carrier 440, cannot rotate. In such a state, when the rotor 110 rotates, the second rotating shaft 300 rotates at a rotation speed equal to rotation speed of the rotor 110, and the rotating body 24 connected to the second rotating shaft 300 also rotates at the rotation speed equal to that of the rotor 110. With the rotation of the second rotating shaft 300, the sun gear 410 in the planetary gear mechanism 400 rotates. As described above, since the planetary carrier 440 is in a fixed state, the first gear and the second gear of the planetary gear 430 respectively rotate in the opposite direction and in the same direction as the sun gear 410, and the internal gear 420 rotates with the sun gear 410 in the same direction. As a result, the first rotating shaft 200 fixed to the internal gear 420 rotates in a same direction as the second rotating shaft 300 at a rotation speed lower than that of the second rotating shaft 300, and the drum 22 fixed to the first rotating shaft 200 rotates in a same direction as the rotating body 24 at a rotation speed slower than that of the rotating body 24. In other words, the rotating body 24 rotates in a same direction as the drum 22 at a rotation speed higher than that of the drum 22.

On the other hand, when the form of the driving portion 30 is switched from the biaxial driving mode to the uniaxial driving mode, as shown in FIG. 3, the cam 652 is rotated by the torque motor 651 such that the cam shaft 653 is rotated in a manner of being provided at the uppermost position. When the cam 652 rotates and the cam shaft 653 moves upward, first, the spring 661 is contracted. When the spring 661 returns to its natural length, the relay rod 660 moves upward as the cam shaft 653 moves, and the lower end portion of the clutch lever 630 is pushed by the relay rod 660 and moves upward. The clutch lever 630 rotates rearward with the support shaft 641 as the center, and the pressing portion 631 separates from the flange portion 612 of the clutch body 610. The clutch body 610 moves rearward by the elastic force of the clutch spring 620, and the engaging flange portion 613 of the clutch body 610 and the engaged concave portion 113 of the rotor 110 are engaged with each other.

When the engaging flange portion 613 and the engaged recessed portion 113 are engaged with each other, the clutch body 610 cannot rotate in a circumferential direction with respect to the rotor 110, so that the clutch body 610 is rotatable together with the rotor 110. In such a state, when the rotor 110 rotates, the second rotation shaft 300 and the clutch body 610 rotate at a same rotation speed as that of the rotor 110. At this time, in the planetary gear mechanism 400, the sun gear 410 and the planetary carrier 440 rotate at the same rotation speed as that of the rotor 110. As a result, the internal gear 420 rotates at a same rotation speed as the sun gear 410 and the planetary carrier 440, and the first rotation shaft 200 fixed to the internal gear 420 rotates at the same rotation speed as that of the rotor 110. That is, in the driving portion 30, the second rotating shaft 300, the planetary gear mechanism 400 and the first rotating shaft 200 rotate integrally. Therefore, the drum 22 and the rotating body 24 rotate integrally.

Figure 7:
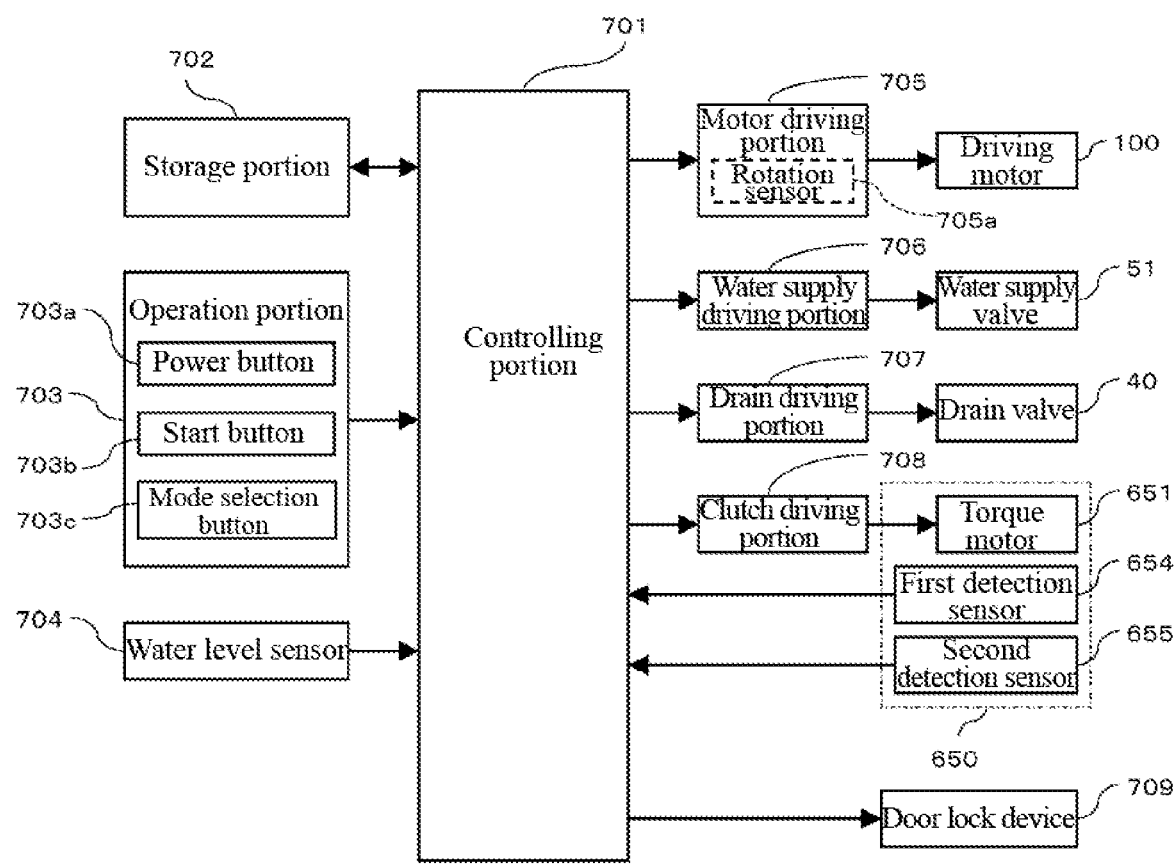
FIG. 7 is a block diagram showing a configuration of a drum-type washing machine according to an embodiment.

FIG. 7 is a block diagram showing the configuration of the drum-type washing machine 1.

In addition to the configuration described above, the drum-type washing machine 1 further includes a controlling portion 701, a storage portion 702, an operation portion 703, a water level sensor 704, a motor driving portion 705, a water supply driving portion 706, a drain driving portion 707, a clutch driving portion 708, and a door lock device 709.

The operation portion 703 includes a power button 703a, a start button 703b, and a mode selection button 703c. The power button 703a is a button for turning on and shutting off power of the drum-type washing machine 1. The start button 703b is a button for starting operations. The mode selection button 703c is a button for selecting an arbitrary washing mode from a plurality of washing modes related to the washing operation, and the operation portion 703 outputs an input signal corresponding to the button operated by the user to the controlling portion 701.

The water level sensor 704 detects water level in the outer tub 20 and outputs a water level detection signal corresponding to the detected water level to the controlling portion 701.

The motor driving portion 705 drives the driving motor 100 according to a control signal from the controlling portion 701. The motor driving portion 705 includes a rotation sensor 705a that detects the rotation speed of the driving motor 100, a frequency conversion circuit, and the like, and adjusts the driving current so that the driving motor 100 rotates at a target rotation speed set by the controlling portion 701. The rotation sensor 705a corresponds to the detecting portion of the present disclosure.

The water supply driving portion 706 drives the water supply valve 51 according to a control signal from the controlling portion 701, and the drain driving portion 707 drives the drain valve 40 according to a control signal from the controlling portion 701.

The clutch driving device 650 includes a first detection sensor 654 and a second detection sensor 655. The first detection sensor 654 detects that the driving mode of the driving portion 30 is switched to the biaxial driving mode and outputs a detection signal to the controlling portion 701. The second detection sensor 655 detects that the driving mode of the driving portion 30 is switched to the uniaxial driving mode and outputs a detection signal to the controlling portion 701. The clutch driving portion 708 drives the torque motor 651 according to the control signal output from the controlling portion 701 based on detection signals from the first detection sensor 654 and the second detection sensor 655.

The door lock device 709 locks and unlocks the door 12 in accordance with the control signal from the controlling portion 701.

The storage portion 702 includes an EEPROM, a RAM, and the like. A program for executing the washing operation of various washing operation modes is stored in the storage portion 702. In addition, various parameters used for executing these programs and various control flags are stored in the storage portion 702.

Based on the signals from the operation portion 703, the water level sensor 704, etc., the controlling portion 701 controls the motor driving portion 705, the water supply driving portion 706, the drain driving portion 707, the clutch driving portion 708, the door lock device 709, and the like according to the programs stored in the storage portion 702.

The drum-type washing machine 1 performs a washing operation of various operation modes based on the operation of the operation portion 703 by the user. In the washing operation, the washing process, the intermediate dehydrating step, the rinsing process and the final dehydrating step are sequentially executed. Depending on the operation mode, the intermediate dehydration step and the rinsing process may be performed twice or more.

In the washing process and the rinsing process, the driving mode of the driving portion 30 is switched to the biaxial driving mode. Water is stored in the outer tub 20 to a predetermined water level that does not reach a lower edge of the input opening 11 so that the laundry in the drum 22 is immersed in water. In this state, the driving motor 100 rotates clockwise and counterclockwise alternately. As a result, the drum 22 and the rotating body 24 alternately rotate clockwise and counterclockwise in a state in which the rotation speed of the rotating body 24 is higher than the rotation speed of the drum 22. At this time, the drum 22 rotates at a rotation speed at which the centrifugal force acting on the laundry in the drum 22 becomes smaller than the gravity.

The laundry in the drum 22 is lifted and dropped by the baffle 23, so that it is beaten on the inner peripheral surface of the drum 22. In addition, at the rear portion of the drum 22, the laundry is brought into contact with a protruding portion 24a of the rotating body 24 that is rotating, and is rubbed and stirred by the protruding portion 24a. As a result, the laundry is washed or rinsed.

As described above, at the time of washing and rinsing, not only mechanical force generated by the rotation of the drum 22 but also mechanical force generated by the rotating body 24 is applied to the laundry so that an improvement in cleaning performance can be expected. In the intermediate dehydration step and the final dehydration step, the driving mode of the driving portion 30 is switched to the uniaxial driving mode. The driving motor 100, that is, the drum 22 and the rotating body 24 rotate integrally at a rotation speed at which the centrifugal force acting on the laundry in the drum 22 becomes larger than the gravity. By the action of the centrifugal force, the laundry is pressed against the inner peripheral surface of the drum 22 and dehydrated.

As described above, during dehydration, since the drum 22 and the rotating body 24 integrally rotate, the laundry sticking to the drum 22 can be satisfactorily dewatered without being agitated by the rotating body 24.

Figure 8:
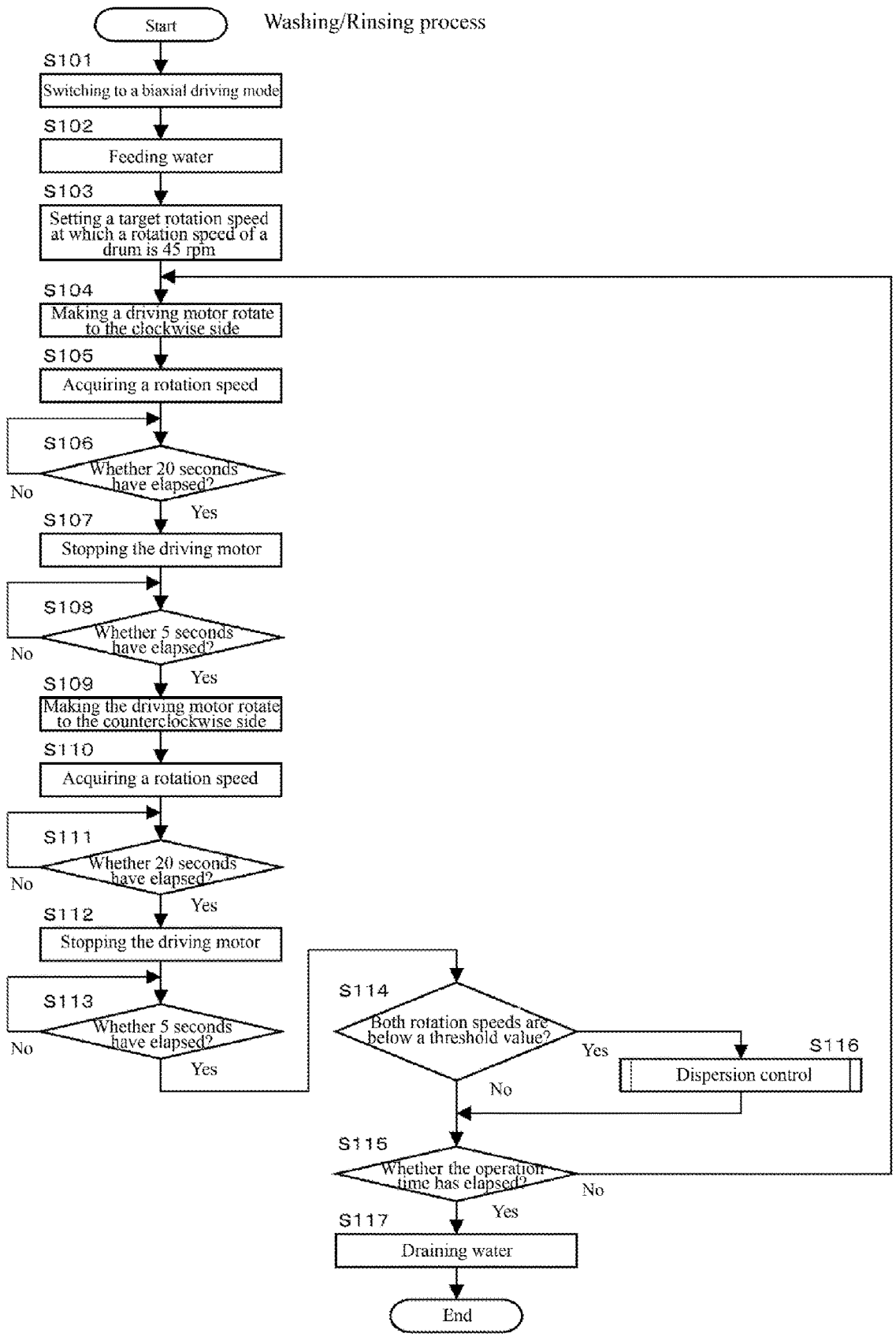
FIG. 8 is a flowchart showing a control operation by a controlling portion in a washing process and a rinsing process according to an embodiment.
Figure 9:
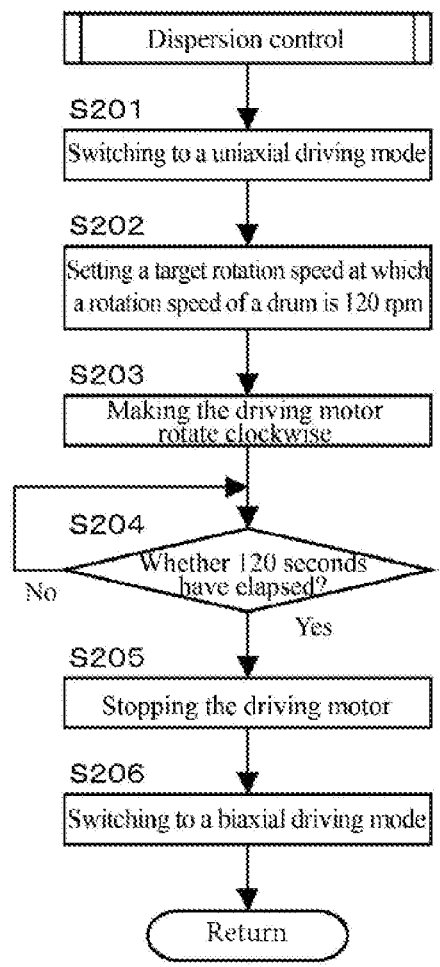
FIG. 9 is a flowchart showing a control operation of a dispersion control performed by a controlling portion according to an embodiment.
Figure 10:
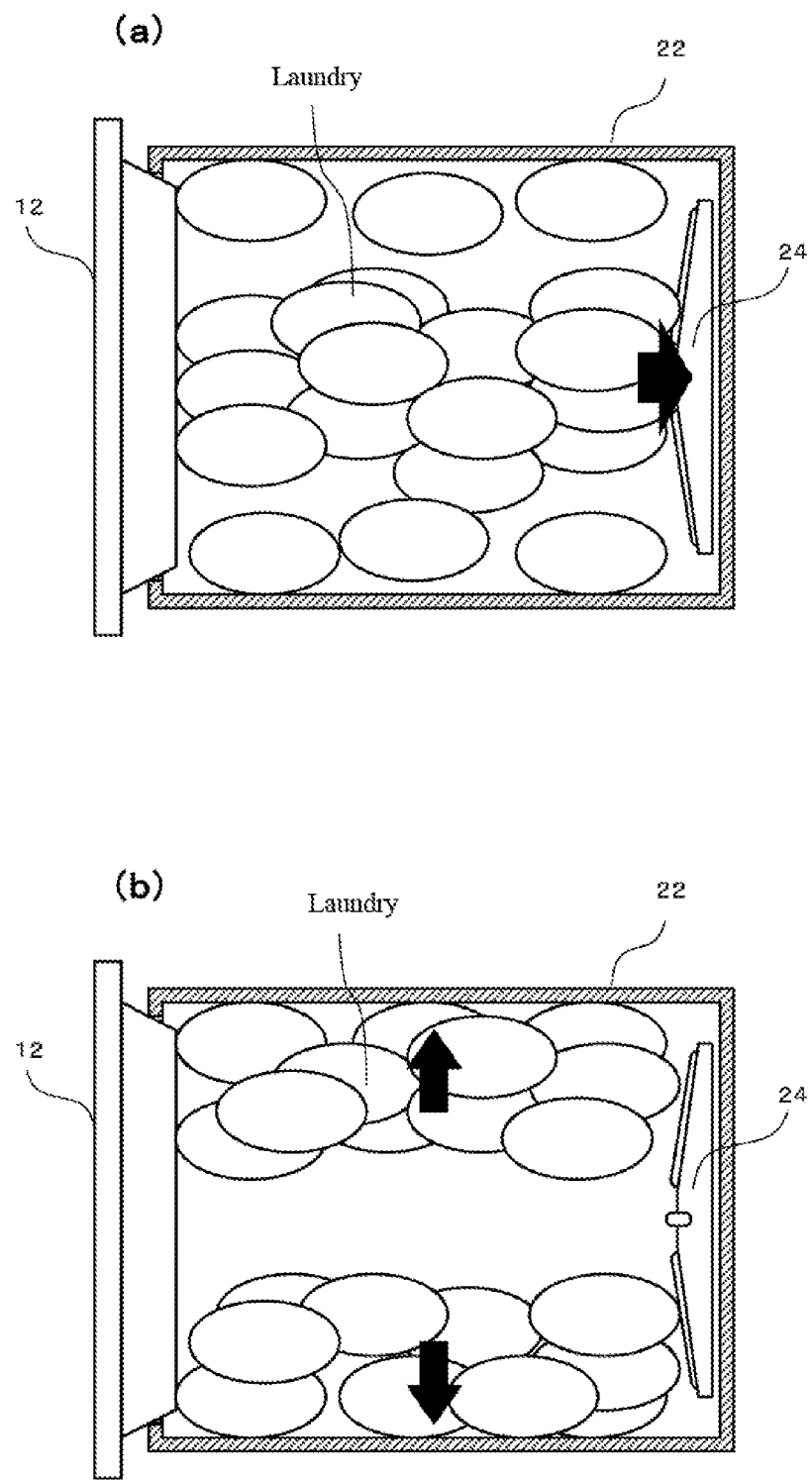
FIG. 10(a) is a view schematically showing that an entangled laundry gathers at a center portion of a drum and a rotating body is compressed by the laundry stacked between a door and a rotating body according to an embodiment.
FIG. 10(b) is a diagram showing that the laundry gathering at the center portion of the drum is dispersed to the inner peripheral surface side of the drum by means of a dispersion control according to an embodiment.

FIG. 8 is a flowchart showing a control operation by the controlling portion 701 in the washing process and the rinsing process. FIG. 9 is a flowchart showing the control operation of the distributed control performed by the controlling portion 701. FIG. 10(a) is a view schematically showing that an entangled laundry may gather at the center portion of the drum 22 and the rotating body 24 is compressed by the laundry stacked between a door 12 and rotating body 24. FIG. 10(b) is a diagram showing that the laundry gathering at the center portion of the drum 22 is dispersed to the inner peripheral surface side of the drum 22.

Hereinafter, the control operation by the controlling portion 701 in the washing process and the rinsing process will be described with reference to FIGS. 8 to 10(b).

When the washing process or the rinsing process is started, the controlling portion 701 switches the driving mode of the driving portion 30 from the uniaxial driving mode to the biaxial driving mode by the clutch mechanism portion 600 (S101). Next, the controlling portion 701 feeds water into the outer tub 20 (S102). That is, the controlling portion 701 opens the water supply valve 51 to supply the water into the outer tub 20, and when the water level in the outer tub 20 reaches the predetermined water level, the controlling portion 701 closes the water supply valve 51 and stops supplying water to the outer tub 20.

When the water supply is completed, the controlling portion 701 sets a target rotation speed of the driving motor 100 at which the rotation speed of the drum 22 is 45 rpm (S103). For example, the target rotation speed of the driving motor 100 is 240 rpm, and this target rotation speed is decelerated to 45 rpm by the planetary gear mechanism 400. When the drum 22 rotates at 45 rpm, the centrifugal force acting on the laundry in the drum 22 is smaller than the gravity, and the laundry tumbles in the drum 22.

The controlling portion 701 controls the motor driving portion 705 to supply driving power to the driving motor 100 so that the driving motor 100 rotates clockwise at the set target rotation speed (S106). In a normal state, the controlling portion 701 acquires the rotation speed of the driving motor 100 that is detected by the rotating sensor 705a at the time of the rotation speed of the driving motor 100 rising to the target rotation speed, for example, at the time of five seconds before the stop of the driving motor 100 (S105). In the normal case, the obtained rotation speed is substantially the target rotation speed.

When 20 seconds have elapsed since the driving motor 100 is rotated clockwise (S106: YES), the controlling portion 701 stops the driving motor 100 (S107). When 5 seconds have elapsed since the stop of the driving motor 100 (S108: YES), the controlling portion 701 controls the motor driving portion 705 to supply driving force to the driving motor 100 so that the driving motor 100 rotates counterclockwise at the target rotation speed (S109). The controlling portion 701 acquires the rotation speed of the driving motor 100 at the same timing as in step S105 (S110).

When 20 seconds have elapsed since the driving motor 100 is rotated counterclockwise (S111: YES), the controlling portion 701 stops the driving motor 100 (S112). When 5 seconds have elapsed since the stop of the driving motor 100 (S113: YES), the controlling portion 701 determines whether the rotation speeds at the clockwise rotation and the counterclockwise rotation stored in the storage portion 702 are equal to or less than a predetermined threshold value (S114). A predetermined ratio with respect to the target rotation speed, for example, a rotation speed of about 90%, can be set as a threshold value. For example, when the target rotation speed is 240 rpm, the threshold value is set to be 220 rpm.

When at least one of the rotation speeds of the clockwise rotation and the counterclockwise rotation is not equal to or less than the predetermined threshold value (S114: NO), if the operation time set for washing or rinsing has not elapsed (S115: NO), the process returns to step S104, and the controlling portion 701 rotates the driving motor 100 clockwise and counterclockwise again, and acquires the rotation speed of the driving motor 100 during that (S104 to S113).

Since the rotating body 24 rotates at a rotation speed different from the rotation speed of the drum 22 at the time of washing and rinsing, the laundry easily to be twisted in the drum 22 and cloth entanglement of the laundry tends to occur. When such an entanglement occurs, the actions of the laundry occur as follows: in the drum 22, as the stirring body 24 rotates, the entangled laundry is entangled at the central portion of the stirring body 24, and is pushed to an axis of the stirring body 24. When such a movement of the laundry occurs, as shown in FIG. 10(a), the entangled laundry may gather at the center portion of the drum 22 and a large amount of laundry may be clogged and compressed between the door 12 and the stirring body 24 in the case in which a large amount of laundry is placed into the drum 22. In this case, a large load generated by the laundry can be easily applied to the stirring body 24.

As described above, when the laundry is pressed against the rotating body 24 due to cloth entanglement in the drum 22 and a heavy load is applied to the rotating body 24, even if a maximum driving force is provided, the rotation speeds of the driving motor 100 clockwise and counterclockwise may not reach the target rotation speeds, but may be equal to or lower than the threshold value.

In step S114, when the controlling portion 701 determines that both the rotation speeds of the clockwise rotation and the counterclockwise rotation are equal to or less than the threshold value (S114: YES), the controlling portion 701 performs a dispersion control (S116). The distributed control corresponds to the reduction control of the present disclosure.

As shown in FIG. 9, first, the controlling portion 701 switches the driving mode of the driving portion 30 from the biaxial driving mode to the uniaxial driving mode by the clutch mechanism portion 600 (S201). Next, the controlling portion 701 sets the target rotation speed of the driving motor 100 at which the rotation speed of the drum 22 is 120 rpm (S202).

The controlling portion 701 controls the motor driving portion 705 to supply driving power to the driving motor 100 so that the driving motor 100 rotates clockwise at the set target rotation speed (S203). As a result, the drum 22 rotates at approximately 120 rpm. In the drum 22, the centrifugal force acting on the laundry becomes larger than the gravity. Therefore, as shown in FIG. 10(b), the laundry densely packed at the center portion of the drum 22 is pushed outward by the centrifugal force and dispersed to the inner peripheral surface side of the drum 22. As a result, the pressing of the laundry on the rotating body 24 is eliminated, and the load applied to the rotating body 24 is reduced.

When 120 seconds have elapsed since the driving motor 100 is rotated clockwise (S204: YES), the controlling portion 701 stops the driving motor 100 (S205). Thereafter, the controlling portion 701 switches the driving mode of the driving portion 30 from the uniaxial driving mode to the biaxial driving mode (S206). In this way, the dispersion control is completed.

Upon completion of the dispersion control, if the operation time has not elapsed (S115: NO), the controlling portion 701 returns to step S104 and again rotates the driving motor 100 clockwise and counterclockwise, during which time the rotation speed is detected (S104 to S113). Thus, the operations of steps S104 to S116 are repeated until the operation time for washing or rinsing has elapsed.

When the operation time has elapsed (S115: YES), the controlling portion 701 opens the drain valve 40 and drains water from the outer tub 20 (S117). When the draining is completed, the washing process or the rinsing process is completed.

According to the present embodiment, when the load applied to the rotating body 24 exceeds a predetermined magnitude due to cloth entanglement of the laundry in the drum 22, the dispersion control is performed so that the load applied to the rotating body 24 is reduced. As a result, locking of the driving motor 100 can be suppressed.

Further, according to the present embodiment, since the determination as to whether or not the load applied to the rotating body 24 is increased is performed based on the rotation speed of the driving motor 100 detected by the rotation sensor 705a, it is not necessary to provide a dedicated sensor for determination, cost increase and the like can be prevented.

Furthermore, according to the present embodiment, when both the rotation speeds of the clockwise rotation and the counterclockwise rotation are equal to or less than the threshold value, it is assumed that the load applied to the rotating body 24 exceeds the predetermined magnitude and shifts to the dispersion control. Therefore, even if there are variations in the ease with which the rotating body 24 and the driving motor 100 rotate in the clockwise direction and the counterclockwise direction, it is determined accurately whether the load applied to the rotating body 24 is increased in the driving portion 30.

Furthermore, according to the present embodiment, even if the laundry entangled at the center portion of the drum 22 due to the cloth entanglement in the drum 22 gathers densely, and is clogged and compressed between the door 12 and the rotating body 24, thereby causing an increasing load to the rotating body 24, the drum 22 can rotate at a rotation speed in which the centrifugal force acting on the laundry in the drum 22 is greater than the gravity by means of the dispersion control, and it is possible to disperse the laundry gathering densely at the center portion toward the inner peripheral surface side of the drum 22, so that it is effective to reduce the load applied to the rotating body 24.

Furthermore, according to the present embodiment, when the drum 22 is rotated in the dispersion control, the driving mode of the driving portion 30 is switched to the uniaxial driving mode so that the necessary torque of the driving motor 100 is smaller compared with that in the biaxial driving mode. As a result, the rotation of the drum 22 tends to rise up to the rotation speed at the time of dispersion control, which is higher than the rotation speed at the time of washing and rinsing.

Although the embodiments of the present disclosure have been described above, the present disclosure is not limited by the above-described embodiments, and the embodiments of the present disclosure may also be modified in various ways.

Figure 11:
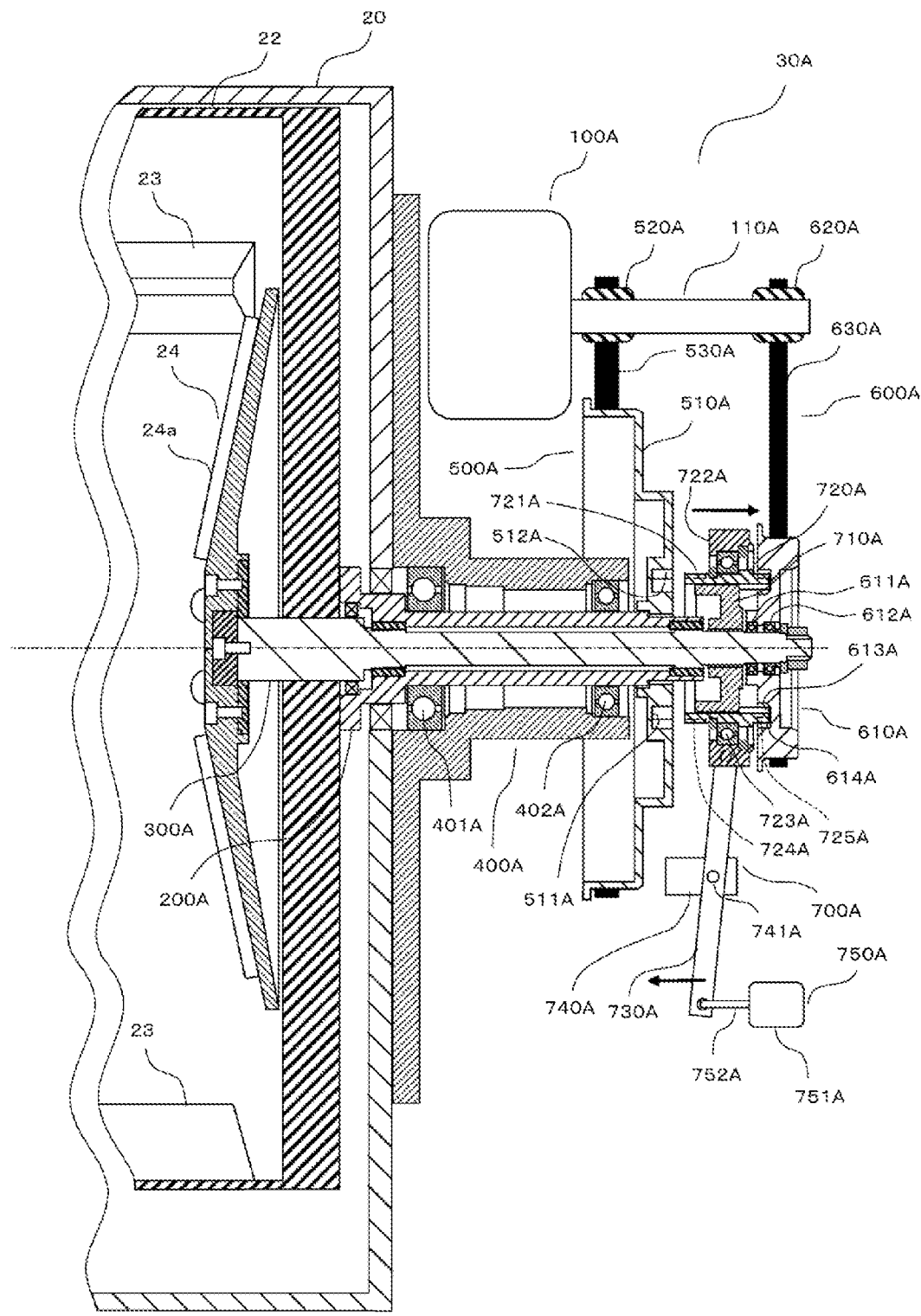
FIG. 11 is a cross-sectional view illustrating a configuration of a driving portion according to modified example one.
Figure 12:
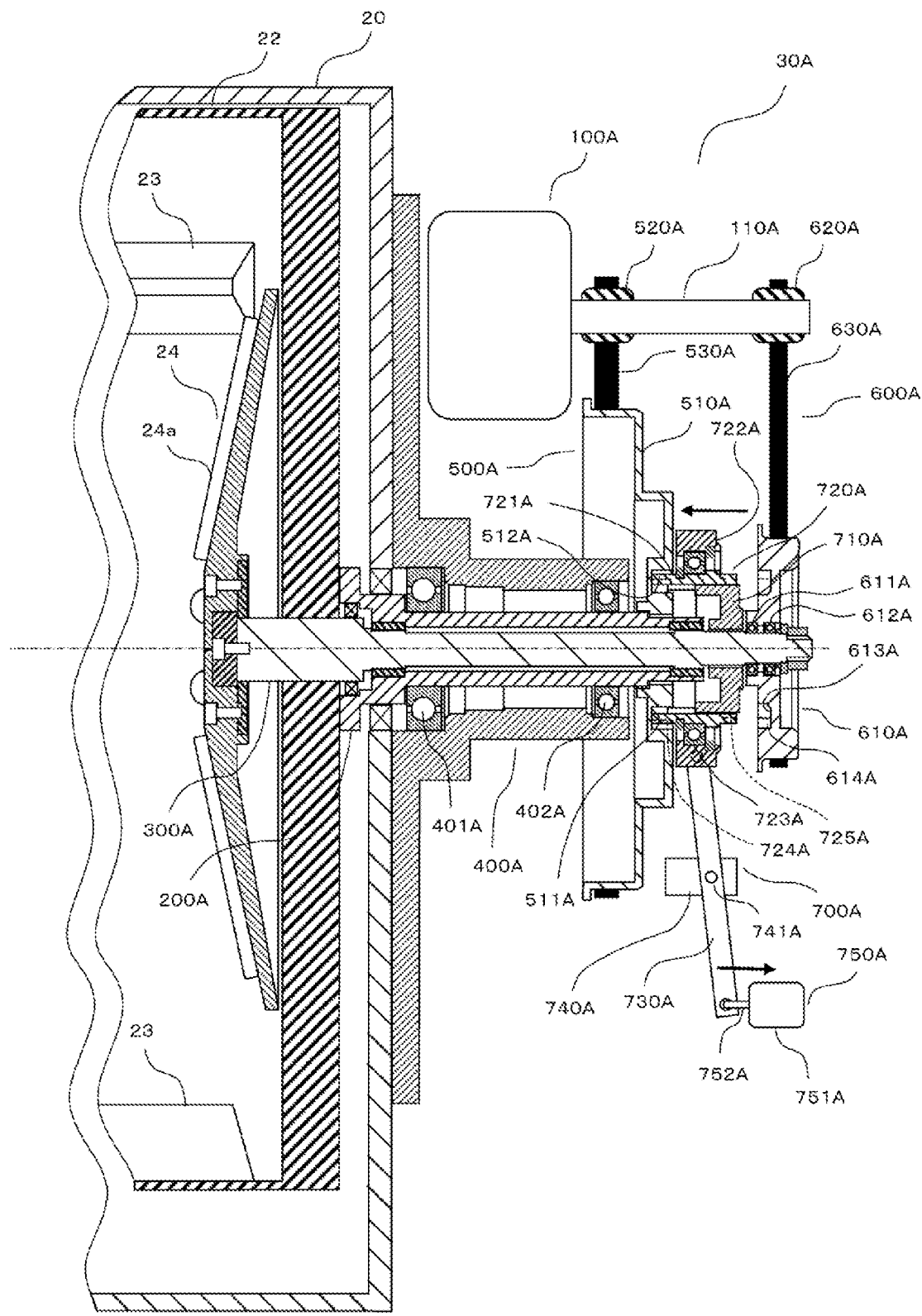
FIG. 12 is a cross-sectional view showing a configuration of a driving portion according to modified example one.

FIG. 11 and FIG. 12 are cross-sectional views showing the configuration of the driving portion 30A according to Modified Example One. FIG. 11 shows a state in which the driving portion 30A is switched to the biaxial driving mode, and FIG. 12 shows a state in which the driving portion 30A is switched to the uniaxial driving mode.

In the above embodiment, the configuration that achieves a speed difference between the drum 22 and the rotating body 24 using a planetary gear mechanism 400, whereas in this modified example, a speed reduction mechanism formed by belt and a pulley is provided to realize a configuration that achieves a speed difference between the drum 22 and the rotating body 24. Hereinafter, the configuration of the driving portion 30A of this modified example will be described in details.

The driving portion 30A includes a driving motor 100A, a first rotating shaft 200A, a second rotating shaft 300A, a bearing unit 400A, a drum speed reduction mechanism portion 500A, a vane reduction mechanism portion 600A and a clutch mechanism unit 700A.

The driving motor 100A is, for example, a brushless DC motor of an inner rotor type, and generates a torque for driving the drum 22 and the rotating body 24. The motor shaft 110A of the driving motor 100A extends rearward.

The first rotating shaft 200A has a hollow shape and rotatably contains the second rotating shaft 300A. A front portion of the second rotating shaft 300A protrudes forward from the first rotating shaft 200A, and a rear portion of the second rotating shaft 300A protrudes rearward from the first rotating shaft 200A. The drum 22 is fixed to the first rotating shaft 200A, and the rotating body 24 is fixed to the second rotating shaft 300A.

The bearing unit 400A is fixed to the rear surface of the outer tub 20 and rotatably supports the first rotating shaft 200A by two bearings 401A and 402A provided therein.

The drum speed reduction mechanism portion 500A includes a first pulley 510A, a first motor pulley 520A and a first belt 530A, decelerates the rotation of the driving motor 100A, and transmits the rotation to the first rotation shaft 200A.

The first pulley 510A is fixed to the rear end portion of the first rotating shaft 200A. An annular engaged concave portion 511A is formed on the rear surface of the first pulley 510A. A spline 512A is formed over the entire circumference on the outer circumferential surface inside the engaged concave portion 511A.

The first motor pulley 520A is attached to a base portion of the motor shaft 110A of the driving motor 100A, and the first belt 530A is bridged between the first pulley 510A and the first motor pulley 520A.

The vane reduction mechanism portion 600A includes the second pulley 610A, the second motor pulley 620A and the second belt 630A, reduces the rotation of the driving motor 100A, and transmits the rotation to the second rotation shaft 300A.

The second pulley 610A is connected to the second rotating shaft 300A via the two bearings 611A and 612A, and is freely and rotatably supported by the second rotating shaft 300A. An annular engaged concave portion 613A is formed on front surface of the second pulley 610A. A spline 614A is formed over the entire circumference on the outer circumferential surface inside the engaged concave portion 613A.

The second motor pulley 620A is attached to the tip end portion of the motor shaft 110A of the driving motor 100A, and the second belt 630A is bridged between the second pulley 610A and the second motor pulley 620A.

Since an outer diameter of the first motor pulley 520A and an outer diameter of the second motor pulley 620A are equal and the outer diameter of the second pulley 610A is smaller than the outer diameter of the first pulley 510A, the reduction ratio by the vane reduction mechanism portion 600A is smaller than that of the drum speed reduction mechanism portion 500A.

The clutch mechanism portion 700A switches the driving mode of the driving portion 30A between the uniaxial driving mode and the biaxial driving mode. The biaxial driving mode is a driving mode in which the second rotation shaft 300A and the second pulley 610A are connected by transmitting the rotation of the second pulley 610A to the second rotation shaft 300A, so that the rotating body 24 can rotate at a speed higher than that of the drum 22. The uniaxial driving mode is a driving mode in which the second rotation shaft 300A and the first pulley 510A are connected by transmitting the rotation of the first pulley 510A to the second rotation shaft 300A, so that the drum 22 and the rotating body 24 can rotate at the same rotation speed.

The clutch mechanism portion 700A includes a clutch guide portion 710A, a clutch body 720A, a clutch lever 730A, a lever support portion 740A and a clutch drive device 750A.

The clutch guide portion 710A and the clutch body 720A are disposed between the first pulley 510A and the second pulley 610A. The clutch guide portion 710A has a cylindrical shape with its front surface opened, and is fixed to the second rotating shaft 300A so as not to move in either the axial direction or the circumferential direction of the second rotating shaft 300A.

The clutch body 720A includes a clutch portion 721A, a surrounding portion 722A and a bearing 723A. The clutch portion 721A has a cylindrical shape in which the front surface and the rear surface are open. On the outer peripheral surface of the clutch portion 721A, the front splines 724A and the rear spline 725A are formed over the entire circumference in the front portion and the rear portion, respectively.

The clutch guide portion 710A is inserted into the clutch portion 721A. The inner circumferential surface of the clutch portion 721A and the outer circumferential surface of the clutch guide portion 710A are coupled by a spline, and the clutch portion 721A can move in the axial direction of the second rotational shaft 300A with respect to the clutch guide portion 710A, i.e. the second rotational shaft 300A to which the clutch guide portion 710A is fixed, but it cannot rotate.

A surrounding portion 722A is formed in an annular shape and surrounds the central portion of the clutch portion 721A so that the clutch portion 721A is freely rotatable. Between the clutch portion 721A and the surrounding portion 722A, a bearing 723A is provided so that the clutch portion 721A rotates smoothly with respect to the surrounding portion 722A.

The upper end portion of the clutch lever 730A is connected to the surrounding portion 722A so that the clutch lever 730A can be rotatable with respect to the surrounding portion 722A. Further, the clutch lever 730A is rotatably supported on a support shaft 741A provided on the lever support portion 740A.

The clutch driving device 750A includes an actuator 751A and an operation lever 752A. The actuator 751A moves the operation lever 752A back and forth. The operation lever 752A is connected to the lower end portion of the clutch lever 730A, which is rotatable with respect to the operation lever 752A.

When the driving mode of the driving portion 30A is switched from the uniaxial driving mode to the biaxial driving mode, as shown in FIG. 11, the operation lever 752A is pushed forward from the inside of the actuator 751A. The lower end portion of the clutch lever 730A is pushed by the operation lever 752A to move forward, and the clutch lever 730A rotates backward around the support shaft 741A. The upper end portion of the clutch lever 730A moves rearward and the clutch body 720A is pushed by the upper end portion of the clutch lever 730A to move rearward. As a result, the rear spline 725A of the clutch portion 721A engages with the spline 614A of the second pulley 610A.

When the rear spline 725A and the spline 614A are engaged, the clutch portion 721A and the second pulley 610A are fixed in the rotation direction. Therefore, the rotation of the second pulley 610A is transmitted to the rotating shaft 300A through the clutch portion 721A and the clutch guide portion 710. In this state, when the driving motor 100A rotates, the rotation is transmitted to the second rotation shaft 300A via the vane reduction mechanism portion 600A, and the rotation body 24 fixed to the second rotation shaft 300A rotates. The rotating body 24 rotates at a rotation speed at which the rotation speed of the driving motor 100A is reduced according to the reduction ratio by the vane reduction mechanism portion 600A. Also, the rotation of the driving motor 100A is transmitted to the first rotation shaft 200A via the drum speed reduction mechanism portion 500A, and the drum 22 fixed to the first rotation shaft 200A rotates. The drum 22 rotates at a rotation speed at which the rotation speed of the driving motor 100A is reduced in accordance with the reduction ratio by the drum speed reduction mechanism portion 500A. As described above, since the reduction ratio by the vane reduction mechanism portion 600A is smaller than the reduction ratio by the drum speed reduction mechanism portion 500A, the rotating body 24 rotates in the same direction at a higher rotation speed than that of the drum 22.

The clutch lever 730A is connected to the surrounding portion 722A connected with the clutch portion 721A in a rotatable state. Thus, even if the clutch portion 721A rotates, the torque generated due to the rotation is not substantially transmitted to the clutch lever 730A.

On the other hand, when the driving mode of the driving portion 30A is switched from the biaxial driving mode to the uniaxial driving mode, the operating lever 752A is drawn into the actuator 751A as shown in FIG. 12. That is, the operation lever 752A moves rearward. The lower end portion of the clutch lever 730A is pulled by the operation lever 752A to move rearward, and the clutch lever 730A rotates forward around the support shaft 741A. The upper end portion of the clutch lever 730A moves forward, and the clutch body 720A is pushed by the upper end portion of the clutch lever 730A to move forward. As a result, the front spline 724A of the clutch portion 721A is engaged with the spline 512A of the first pulley 510A.

When the front spline 724A is engaged with the spline 512A, the clutch portion 721A and the first pulley 510A are fixed in the rotation direction, so that the rotation of the first pulley 510A is transmitted to the rotating shaft 300A through the clutch portion 721A and the clutch guide portion 710. In this state, when the driving motor 100A rotates, the rotation is transmitted to the first rotation shaft 200A and the second rotation shaft 300A via the drum speed reduction mechanism portion 500A, and the drum 22 and the rotation body 24 rotate. The drum 22 and the rotating body 24 integrally rotate in the same direction at the rotation speed at which the rotation speed of the driving motor 100A has decreased in accordance with the reduction ratio by the drum speed reduction mechanism portion 500A.

In the uniaxial driving mode, when the driving motor 100A rotates, the second pulley 610A also rotates in accordance with the rotation. However, the second pulley 610A only idly rotates with respect to the second rotating shaft 300A, and the rotation of the second pulley 610A is not transmitted to the second rotating shaft 300A.

In the above embodiment, the dispersion control is performed when the rotation speeds of the driving motor 100 at the time of clockwise and counterclockwise rotations are equal to or less than the threshold value. That is, it is determined whether or not the load applied to the rotating body 24 is larger based on the rotation speed of the driving motor 100. However, the present disclosure is not limited to this, and for example, even if a current sensor for detecting the current flowing through the driving motor 100 is provided and the dispersion control is performed when the magnitude of the current flowing through the driving motor 100 becomes equal to or larger than the predetermined threshold value, the dispersion control still can be performed. That is, the magnitude of the load applied to the rotating body 24 may be determined based on the magnitude of the current flowing through the driving motor 100.

Further, in the above-described embodiment, the dispersion control is performed when the rotation speeds of both the clockwise and counterclockwise rotations of the driving motor 100 are equal to or less than the threshold value. However, the present disclosure is not limited to this. For example, the dispersion control may be performed when at least one of the rotation speeds of both the clockwise and counterclockwise rotations of the driving motor 100 is equal to or less than the threshold value. In addition, the controlling portion 701 may acquire the rotation speed of only one of the rotation speeds instead of both rotation speeds.

Furthermore, in the above embodiment, the drum 22 is rotated clockwise only once in the dispersion control. However, the drum 22 may also be rotated counterclockwise only once. Further, the drum 22 may be rotated clockwise or counterclockwise a plurality of times, and furthermore, the drum 22 may be rotated clockwise or counterclockwise once or a plurality of times.

Furthermore, in the above-described embodiment, in both of the washing process and the rinsing process, when the drum 22 is rotated clockwise or counterclockwise, the dispersion control is performed in the case in which the rotation speed of the driving motor 100 is equal to or lower than the threshold value. However, such a control operation may be performed only in one of the washing process and the rinsing process.

Furthermore, in the above-described embodiment, the rotation speed of the driving motor 100 is detected by the rotation sensor 705a. However, it is also possible to adopt a configuration in which the controlling portion 701 instead of the rotation sensor 705a detects the rotation speed. In this case, the controlling portion 701 corresponds to the detecting portion of the present disclosure.

Furthermore, in the above embodiment, the drum 22 is rotated about the axis inclined with respect to the horizontal direction. However, the drum-type washing machine 1 may be configured such that the drum 22 rotates about a horizontal axis.

Furthermore, although the drum-type washing machine 1 in the above embodiment does not have a drying function, the present disclosure also can be applied to a drum-type washing machine having a drying function, that is, a drum-type washing and drying machine.

In addition, various modifications can be made to the embodiments of the present disclosure as appropriate within the scope of the technical idea described in the technical solutions.

DESCRIPTION OF THE REFERENCE NUMBERS

10: machine housing; 20: outer tub; 22: drum; 24: rotating body; 24a: protruding portion; 30: driving portion; 100: driving motor; 701: controlling portion; 705a: rotating sensor (detecting portion).

What is claimed is:

1. A drum-type washing machine, comprising:
an outer tub, which is disposed within a machine housing;
a drum, which is disposed in the outer tub and rotatable about a horizontal axis or about an axis inclined with respect to a horizontal direction;
a rotating body, which is disposed in the drum and having a protruding portion in contact with laundry on a surface of the rotating body;
a driving portion, which comprises a driving motor and is configured to transmit a torque of the driving motor to the drum and the rotating body so as to rotate the drum and the rotating body at different rotation speeds;
a controlling portion configured for controlling an operation of the driving portion; and
a detecting portion configured for detecting a rotation speed of the driving motor;
wherein the controlling portion is configured to perform a reduction control for reducing a load when a magnitude of the load applied to the rotating body exceeds a predetermined magnitude in at least one of a washing process or a rinsing process;
wherein the controlling portion is further configured to adjust an electric power to be supplied to the driving motor so that the driving motor rotates at a target rotation speed when the rotation body is rotated under control of the controlling portion, and perform the reduction control when the rotation speed of the driving motor is equal to or less than a threshold value below the target speed; and
wherein the controlling portion is further configured to rotate the driving motor clockwise and counterclockwise, and perform the reduction control when the rotation speed of the driving motor is equal to or less than the threshold value in both directions.

2. The drum-type washing machine according to claim 1, wherein the controlling portion is further configured to rotate the driving motor so that the drum rotates at a rotation speed at which a centrifugal force acting on the laundry in the drum becomes greater than a gravity, as the reduction control.

3. The drum-type washing machine according to claim 2, wherein the driving portion is configured to be switched between a first driving mode, in which the drum and the rotating body are rotated at mutually different rotation speeds, and a second driving mode, in which the drum and the rotating body are integrally rotated at equal rotation speeds, and
the controlling portion is further configured to rotate the driving motor so that the drum rotates at a rotation speed at which the centrifugal force acting on the laundry in the drum becomes greater than the gravity in the second driving mode.

* * * * *